Feb. 10, 1959    J. W. BAKKE    2,872,978
TIRE-BUFFING MACHINE
Filed Dec. 21, 1953    2 Sheets-Sheet 1
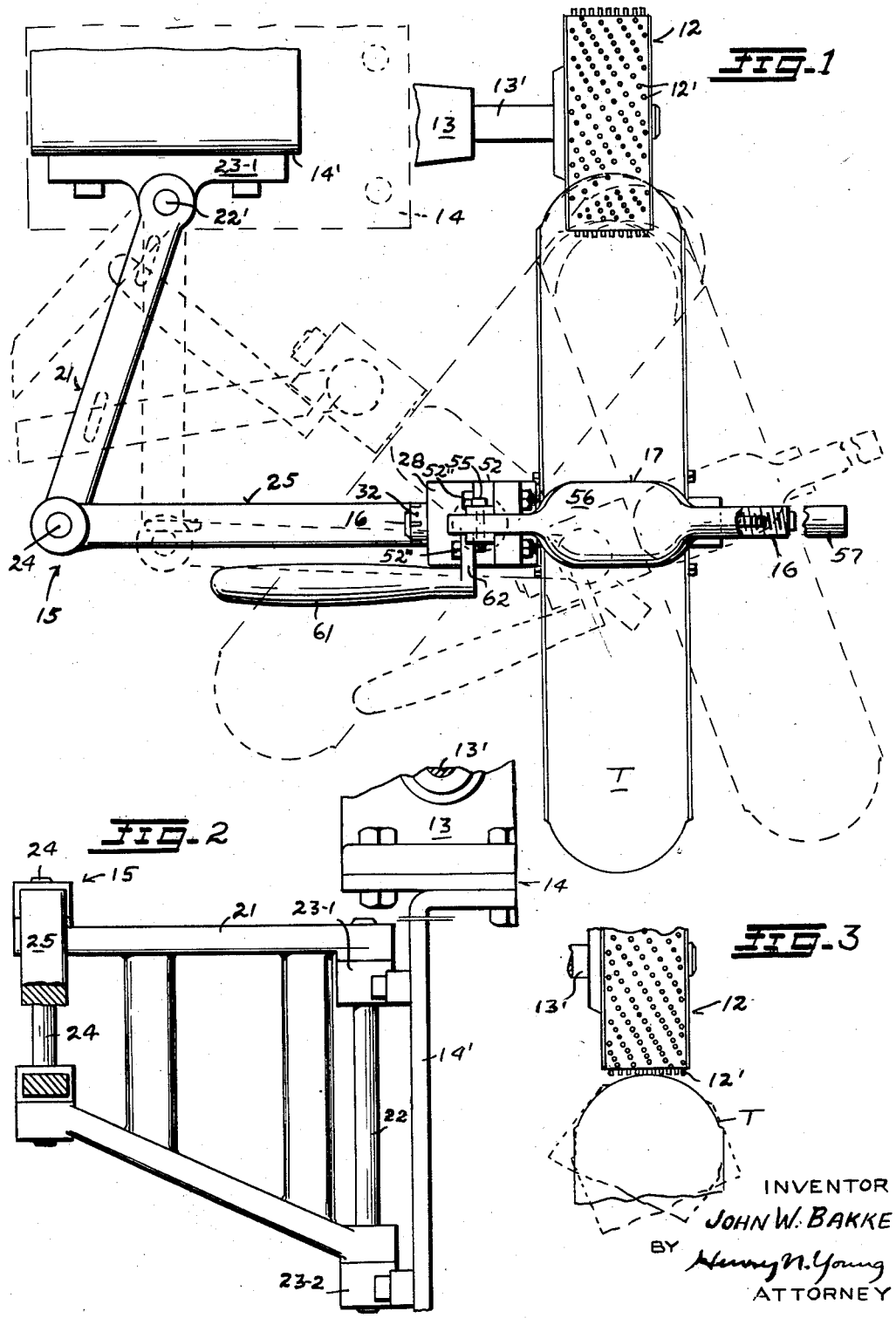
INVENTOR
JOHN W. BAKKE
BY Henry N. Young
ATTORNEY

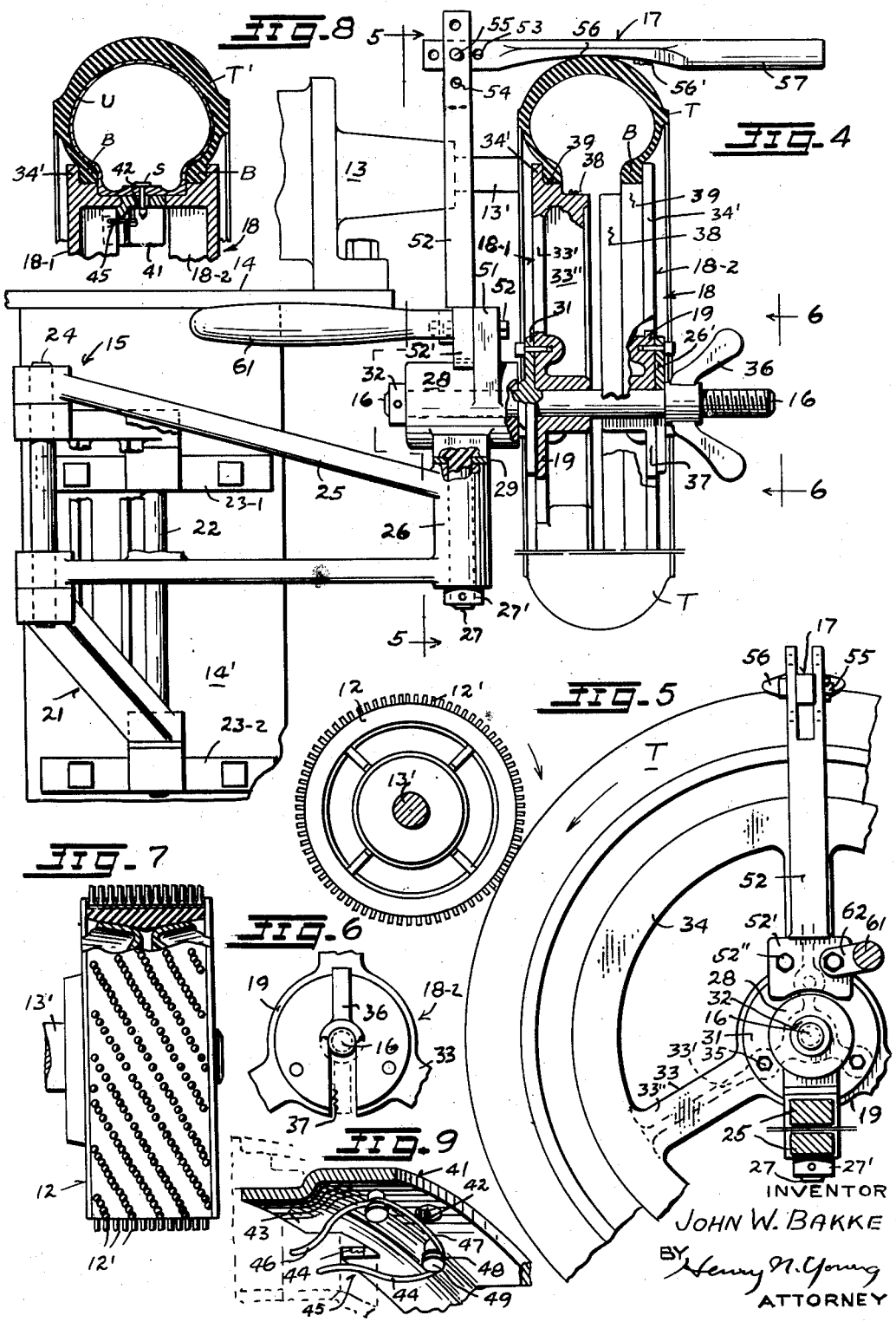

2,872,978

TIRE-BUFFING MACHINE

John W. Bakke, Oakland, Calif., assignor, by decree of final distribution, to Norman W. Bakke and Jack W. Bakke, both of Oakland, Calif.

Application December 21, 1953, Serial No. 399,285

7 Claims. (Cl. 164—10.2)

The invention relates to a unitary machine for removing remaining tread portions from worn vehicle tires of rubber or the like to prepare the tires for retreading.

A general object is to provide an improved tire-supporting assembly for mounting on a stand providing a power-driven rotary buffing drum and adapted for a particularly ready presentation of the tire tread portion against the drum at various angles for effecting a full-width buffing of the tread.

Another object of the invention is to provide a facilitated mounting and dismounting of a tire on a tire-supporting wheel mounted on a rotary spindle of the support assembly.

A further object is to provide a means for mounting either an uninflated or inflated tire on the support wheel for a buffing of its tread by use of the machine.

An added object is to provide a particularly simple and effective brake means for controlling the rate of buffing action by the buffing drum operating against the tire tread.

Yet another object is to provide for a simple and effective manual control of the positions of the tire tread and the brake means.

The invention possesses other objects and features of advantage, some of which with the foregoing will be set forth or be apparent in the following description of a typical embodiment thereof, and in the accompanying drawings, in which:

Figure 1 is a fragmentary plan view of a machine embodying the features of the present invention.

Figure 2 is a fragmentary elevation showing a tire-supporting bracket arm of the machine as mounted on a support pedestal thereof.

Figure 3 is a fragmentary view illustrating the application of the tread of a tire to a buffing drum of the machine in various angular relations thereto.

Figure 4 is a front elevation of the structural combination of Figure 1, with portions of the tire-mounting structure and a mounted tire shown in section in an upright plane through the axis of a tire-mounting spindle of the support.

Figure 5 is a fragmentary elevation taken at the line 5—5 in Figure 4.

Figure 6 is a fragmentary elevation taken at the line 6—6 in Figure 4.

Figure 7 is a partly sectional and enlarged side view of the buffing head of the machine.

Figure 8 is a fragmentary sectional view showing a pneumatic tire provided with an inflated tube mounted on rim elements of the tire-mounting assembly.

Figure 9 is an enlarged fragmentary perspective of an accessory rim element shown in Figure 8, and discloses the details of a clip means for releasably fixing the ring to the spokes of a tire-mounting rim section of the machine.

The tire buffing machine of my invention essentially comprises a unitary assembly including a rotary buffing drum 12 providing spikes or prongs 12' on its working face and directly mounted on the horizontally disposed shaft 13' of an electric motor 13 carried at the top of a supporting pedestal 14 which also mounts an arm 15 carrying at its extremity a horizontally disposed spindle 16 on which a tire may be mounted for its buffing. The arm 15 is articulated to provide for the application of the mounted tire against the buffing drum through a full range of angular relations which provides for a complete buffing removal of the tread portion of the tire. The assembly further includes a brake arm element 17 arranged for its lateral application to the tread of a tire engaging the drum 12 to retard the rotation of the tire for controlling the rate of abrasion produced by the engagement of the rotating drum with the tire. A tire to be buffed is mounted on the rim of a wheel 18 having axially separable inner and outer complementary and substantially like sections 18–1 and 18–2, with the bores of the hubs 19 of the sections closely and slidably receiving the spindle and the hub of the mounted spindle 18–1 suitably held for rotation with the spindle.

Referring more particularly to the disclosed structure of the articulated arm 15, it will be noted that said arm comprises an inner section 21 hinged to a side 14' of the pedestal 14 by means of a vertical hinge pin 22 carried by and between upper and lower brackets 23–1 and 23–2 bolted to said side 14'. An upright hinge pin 24 suitably connects the outer end of the arm section 21 with the inner end of an arm section 25 provided at its other end with an upright tubular bearing 26 which rotatably receives a stem 27 of a head 28 in which the spindle 16 is suitably journaled for its free rotation about a horizontal axis which is perpendicular to the stem axis; a suitable anti-friction bearing ring 29 is provided between the head 28 and the upper end of the bearing 26 whereby the head 28 is supportedly swiveled to the arm end thereat. As particularly shown, a collar 27' removably fixed on the stem 27 below the bearing 26 is normally operative to prevent a dismounting of the head 28 by an upward withdrawal of its stem from the bearing. For providing the desired rigidity of support for the spindle-mounting head 28, the inner arm section 21 is relatively deep at the hinge pin 22, and the depth of the arm progressively decreases to its end at the terminal bearing 26 thereof.

As shown, the spindle 16 is provided with an integral flange 31 opposite and adjacent an end of the head 28, and the spindle portion engaged through the head has a collar 32 releasably fixed to a portion which extends beyond the other head end, whereby to prevent an axial shifting of the spindle in its journalled engagement in the head. Three spokes 33 radiate symmetrically from the wheel hubs 19 to circular rim portions 34 of the wheel sections, said spokes being of T section and having their webs 33' extending axially of the wheels and their flanges 33" coplanar and defining the mutually outer sides of the sections. Screws 35 extend through the spindle flange 31 into the inner ends of the spokes of the inner wheel section 18–1 to secure the section for its rotation wtih the spindle. The wheel section 18–2 is arranged to be retained on the spindle by means of a wing nut 36 operating against the outer section face through a washer 26' fixed against the hub end thereat to provide a thrust bearing for the nut. As particularly shown, the hub of the wheel section 18–2 between the two spokes thereof is provided with a radial slot 37 extending from the hub bore and having a width equal to the spindle diameter whereby to provide for a mounting and dismounting of the section laterally of the spindle without necessitating a complete removal of the wing nut 36 during the mounting or dismounting of a tire on the wheel rim in the manner hereinafter described.

It will now be noted that the rim portions 34 of the wheel sections have their peripheries complementarily stepped inwardly from the edges of radial flanges 34' extending at their mutually opposite sides to provide seats for the inner faces of the beads B of a tire casing T of a usual structure. For accommodating tires of more than one size, the stepping of the outer rim faces is shown as providing corresponding peripheral faces 38 and 39 having the inside diameters of the beads of tires of two different sizes for an optional mounting of tires of either size on the rim. When a tire casing is to be mounted on the present support wheel 18, the outer wheel section 18-2 is dismounted and the tire is then mounted on the rim portion 34 of the inner wheel section 18-1 with its bead engaging the appropriate rim face 38 or 39 thereof. The wheel section 18-2 is then mounted on the spindle outwardly of the tire and is moved inwardly along the spindle by the action of the nut 36 to engage the tire bead with and about the corresponding face 38 or 39 of the rim to secure the mounted tire casing for its buffing application against the buffing drum 12, such a mounting of a casing being illustrated in Figure 4 in which the wheel sections are slightly spaced, the latter relation of the cooperative sections being a usual one.

While it is a general practice to buff uninflated tires to prepare their treads for retreading, it is sometimes desired that a tire be buffed for the purpose while inflated. Figure 8 discloses a tire T' provided with an inner tube U having a valved stem S for the application of compressed air within the tube U to inflate the tire. Since pressure in the tube U would cause a damaging projection of the inside portion of the tube through the gap normally provided between the rim sections adjacent the inner seat faces 39, a spacing ring 41 is provided for engagement by and between the section rims before inflation of the tube U is effected, the ring 41 being applied after the tire casing T' containing the uninflated tube U has been mounted on the inner wheel section 18-1 and before the outer wheel section 18-2 is applied. The ring 41 is provided with an opening 42 for freely receiving the stem S therethrough to permit access to the inner stem end for effecting the inflation of the tube after the ring has been clamped between the rim sections.

Means are preferably provided for holding the ring 41 in its appropriate centered position on the rim of the wheel section 18-1 while the wheel section 18-2 is being applied; as is particularly brought out in Figure 9, the ring 41 has an inwardly offset lateral part 43 for centered disposal within the opposed rim portion of the wheel section 18-1, said part being provided with notches 44 for receiving the webs 33' of the opposed spokes 33. The appropriate initial positioning of the ring 41 may be further assured by means of a spring C-clip 45, said clip, in the present instance, being formed from a piece of spring wire to provide opposed end portions 46 connected to an intermediate portion 47 by loops 48. The end portions 46 of a clip are arranged to resiliently grip a spoke web 33 between them, and the clip is attached to the ring 41 by headed posts 49 engaged through the loops 48 and extending fixedly from the inner face of the ring. In practice, rings 41 are provided having the portions which are arranged for engagement between opposed rims of different and appropriate widths in accordance with tires of different size having their beads engageable with the different peripheral rim faces 38 or 39.

The generally cylindrical spindle-mounting head 28 is provided with an upstanding extension 51 which mounts an upright post element 52 extending rigidly from the head extension 51, and has a base portion 52' bolted to the extension 51 by bolts 52", said post element being engaged by the brake element 17 as a swingable arm at its top. The upper end of the present element 52 is bifurcated for the hinging of one end of the brake element 17 within its forked end, and longitudinal lines of holes 53 and 54 are respectively provided in the intersecting end portions of the brake arm and the post elements 17 and 52 for variable mutual alignments thereof for receiving a pivot pin 55 for effecting different hinge connections of the element 17 and the post at adjustably variable distances from the tire-engaging intermediate portion 56 of the brake element 17 and for different radial adjustments of the pin 55 with respect to the spindle axis.

The intermediate portion 56 of the brake element 17 is shown as relatively wide and provides a longitudinally arched bearing face 56' for frictional engagement with the tread of a tire which is applied against the rotating buffing drum 12 and is being rotated by reason of its contact with the drum. When the bearing face 56' of the brake arm 17 is applied to and across a rotating tread for retarding the rotation of its tire under the influence of the buffing drum 12, an abrasive slippage is produced between the drum and tire tread to a degree determined by the pressure of the element against the tire tread, and it will be understood that such slippage results in a wearing away of the tire tread at a rate determined by the pressure with which the brake element is applied against the tire tread by a hand applied to the grip provided by the free handle end 57 of the element 17.

A handle element 61 is fixedly mounted on the head extension 51 in oppositely directed relation with respect to the spindle 16 and provides a suitably shaped hand grip of generally circular cross-section. The handle 61 is provided at its inner end with a radial offset 62 which provides a hole in parallel offset relation to the handle line for receiving one of the bolts 52" which secures the post element 52 to the head; when the engaged bolt 52" is tightened, it secures the handle 61 against the base 52' of the post element 52 in offset relation to the bolt axis whereby the grip portion of the handle may be adjusted about the bolt axis for facilitating its use by the operator of the machine.

Having a tire mounted on the wheel assembly 18 and free of the rotating buffing drum 12, an operator may effect the desired buffing of the tire tread by grasping the positioning handle 61 in one hand for moving the tire against the drum in desired angular relation to the drum, and then, with his other hand applied to the brake arm handle 57, press the brake arm against the tire with appropriate pressure to provide the desired abrasion-producing anti-rotation drag on the tire. Accordingly, the operator may angularly adjust the tire with respect to the drum while varying the pressure of the brake arm against the tire, whereby the complete conditioning of a worn tire tread for receiving a retread overlay is readily and quickly accomplishable. When not in use, the brake arm 17 may be swung about and over the pivot pin 55 to overly the motor 13 and then be out of the way. It will thus be obvious that the present machine comprises a particularly efficient means for effecting a complete buffing conditioning of a worn tire tread for recapping under constant manual control of the operator.

From the foregoing description taken in connection with the accompanying drawings, the advantages of the present tire-buffing machine will be readily understood by those skilled in the art to which the invention apertains. While I have herein described the construction and use features of a form of my invention which is now considered to comprise a preferred embodiment thereof, I desire to have it understood that the present disclosure is primarily illustrative, and that such changes and developments may be made, when desired, as fall within the scope of the following claims:

I claim:

1. In a tire-buffing machine, a support frame, a drive shaft fixedly mounted on said frame in horizontal disposition, a rotary buffing drum fixedly mounted on said shaft and having a cylindrical working face, a tire-support wheel of rigid structure having a continuous tire-mounting rim coaxially carried by a central hub and arranged to mount an inflated pneumatic tire, a support spindle fixedly engaged with the wheel hub in axially extending relation thereto, and a support arm swingably carried by the frame and rotatably mounting the extending spindle portion for its swinging adjustment in solely a horizontal plane for the disposal of the tread of an inflated wheel-carried tire with its periphery in circumferentially tangent engagement with the drum periphery for inducing a rotation of the tire with the spindle and an abrasion of its tread by reason of the engagement of the tread with the rotating drum.

2. In a tire-buffing machine, a support frame, a drive shaft fixedly mounted on said frame in horizontal disposition, a rotary buffing drum fixedly mounted on said shaft and having a cylindrical working face, a tire-support wheel of rigid structure having a tire-mounting rim fixedly carried by a central wheel hub, a support spindle fixedly engaged with the wheel hub and mounting said wheel for its rotation with it, and an articulated support arm swingably carried by the frame and terminally journalling the spindle in extending relation to the arm for a swinging adjustment of the spindle in a horizontal plane for the disposal of the tread of a wheel-carried tire with its periphery in circumferentially tangent engagement with the drum periphery while the spindle axis is in variably adjusted angular relation to the axis of the drum-carrying shaft, whereby to induce a rotation of the tire with the spindle and an abrasion of its tread by reason of the engagement of the tread with the rotating drum.

3. In a tire buffing machine, a support frame, a drive shaft fixedly mounted on said frame in horizontal disposition, a rotary buffing arm fixedly mounted on said shaft and having a cylindrical working face, a tire-support wheel having a continuous tire-mounting rim fixedly and coaxially carried by a tubular central hub and arranged to mount an inflated pneumatic tire, a spindle fixedly in said hub for mounting said wheel for its free rotation with the spindle, an articulated arm extending from the support and terminally journalling the spindle for swinging adjustments thereof in a horizontal plane and providing for a disposal of the tread of a tire on the spindle-carried wheel in circumferentially tangent engagement with the drum periphery while the spindle is in variable angular relation to the drum-carrying shaft and for inducing a rotation of the tire and an abrasion of its tread by reason of the engagement of the tread with the drum, and a friction brake member hingedly carried by the arm section supporting the spindle and providing a friction face which is manually applicable radially against the tire tread engaging the working face of the drum for retarding the induced rotation of the tire to thereby increase the abrasive action of the buffing drum with respect to the tire tread.

4. In a tire-buffing machine providing a rotary buffing drum mounted on a base, a tire-mounting assembly comprising an arm mounted on said base for its horizontal swinging and terminally providing a rotatable longitudinally extending spindle for mounting a tire-supporting wheel for the movement of a tire thereon against the operating buffing drum, a tire-supporting wheel mounted on said spindle and comprising axially separable first and second wheel sections having hub portions complementarily receiving the spindle and providing mutually complementary outwardly flanged rim portions for engaging between their flanges the beads of a tire for retainedly mounting the tire on the wheel, means fixing the hub of the first said wheel section to the spindle for rotation therewith, and a nut element threadedly mounted on the spindle and operative against the spindle-mounted second said wheel section at its hub to adjustably move the latter wheel section toward the first wheel section on the spindle while restraining the second wheel section for rotation with the first wheel section.

5. A structure in accordance with claim 4 having the second wheel section provided with spokes radiating from its hub and a radial slot extending through its hub portion between the bases of one pair of adjacent spokes for freely receiving the spindle to provide for a mounting and dismounting of the second wheel section with respect to the spindle without requiring a dismounting of the nut element by providing for the passage of the spindle and mounted nut element through the space between said adjacent spokes.

6. A structure in accordance with claim 4 provided with a free rim element arranged for its interposed engagement in the space between the opposed edges of the rim portions of the wheel sections to limit the movement of the wheel sections toward each other along the spindle, said element being provided with a radial opening for freely receiving the valve stem of a pneumatically inflatable tire mounted on the wheel.

7. In a tire-buffing machine providing a rotary buffing drum mounted on a base, a tire-mounting assembly comprising an arm mounted on said base for its horizontal swinging and terminally providing a rotatable longitudinally extending spindle for mounting a tire-supporting wheel for the movement of a tire thereon against the operating buffing drum, a tire-supporting wheel mounted on said spindle and comprising axially separable first and second wheel sections having hub portions respectively arranged to fixedly and slidably receive the spindle and providing mutually complementary outwardly flanged rim portions for retainedly engaging the different beads of a pneumatically inflatable tire on the wheel between the flanges, a nut element threadedly mounted on the spindle and operative against the second said wheel section to adjustably move it toward the first wheel section on the spindle, and a continuous supplementary rim element arranged for its interposed engagement in the space between the opposed edges of the rim portions to limit the movement of the sections toward each other along the spindle while filling the space between said opposed rim edges, said rim element being provided with means for releasably fixing it in centered position on one of said wheel sections and providing a radial opening for freely receiving the valve stem of a pneumatically inflatable tire mounted on the rim.

References Cited in the file of this patent

UNITED STATES PATENTS

| | | |
|---|---|---|
| 1,848,684 | Woock | March 8, 1932 |
| 2,200,575 | Haskins | May 14, 1940 |
| 2,254,526 | Hawkinson | Sept. 2, 1941 |
| 2,270,119 | Green | Jan. 13, 1942 |
| 2,283,005 | Godfrey | May 12, 1942 |
| 2,294,047 | Pollock | Aug. 25, 1942 |
| 2,333,599 | Terry | Nov. 2, 1943 |
| 2,364,384 | Oakes | Dec. 5, 1944 |
| 2,366,685 | Chambers | Jan. 2, 1945 |
| 2,493,289 | Hawkinson | Jan. 3, 1950 |
| 2,515,167 | Arel | July 18, 1950 |
| 2,610,446 | Hawkinson | Sept. 16, 1952 |
| 2,636,277 | Hawkinson | Apr. 28, 1953 |
| 2,694,247 | Rose | Nov. 16, 1954 |